(12) United States Patent
Guth

(10) Patent No.: US 7,556,432 B2
(45) Date of Patent: Jul. 7, 2009

(54) GUIDE RAIL FOR GUIDE CARRIAGES OF A LINEAR GUIDEWAY

(75) Inventor: Jorg Guth, Brucken (DE)

(73) Assignee: Schaeffler KG, Herzogenaurach (DE)

( * ) Notice: Subject to any disclaimer, the term of this patent is extended or adjusted under 35 U.S.C. 154(b) by 499 days.

(21) Appl. No.: 10/574,646

(22) PCT Filed: Aug. 24, 2004

(86) PCT No.: PCT/EP2004/009428

§ 371 (c)(1),
(2), (4) Date: May 8, 2006

(87) PCT Pub. No.: WO2005/033533

PCT Pub. Date: Apr. 14, 2005

(65) Prior Publication Data

US 2007/0019892 A1    Jan. 25, 2007

(30) Foreign Application Priority Data

Oct. 1, 2003    (DE) ................. 103 45 871

(51) Int. Cl.
*F16C 29/00* (2006.01)
(52) U.S. Cl. ........................................ 384/55
(58) Field of Classification Search ............. 384/43–45, 384/49, 55; 238/151, 179, 216
See application file for complete search history.

(56) References Cited

U.S. PATENT DOCUMENTS

| 804,989 | A | * | 11/1905 | Walker | 238/234 |
| 826,812 | A | * | 7/1906 | Wingren | 238/169 |
| 1,374,804 | A | * | 4/1921 | Bakovich | 238/151 |
| 4,289,274 | A | * | 9/1981 | Hudson et al. | 238/249 |
| 4,934,276 | A | * | 6/1990 | Garpentin et al. | 104/111 |
| 5,445,045 | A |   | 8/1995 | Nagai et al. |  |
| 5,553,947 | A | * | 9/1996 | Scheib et al. | 384/55 |
| 5,687,649 | A | * | 11/1997 | Koeninger et al. | 238/255 |
| 6,557,775 | B1 | * | 5/2003 | Brinson et al. | 238/10 R |

FOREIGN PATENT DOCUMENTS

| CH | 5 62 968 | 6/1975 |
| DE | 24 20 864 | 11/1975 |
| DE | 34 35 062 | 4/1986 |
| DE | 41 21 770 | 1/1993 |
| DE | 43 37 859 | 5/1994 |
| DE | 43 01 435 | 1/1995 |
| DE | 43 36 282 | 4/1995 |
| DE | 44 39 513 | 5/1995 |
| DE | 43 95 740 | 6/1997 |

(Continued)

*Primary Examiner*—Thomas R Hannon
(74) *Attorney, Agent, or Firm*—Charles A. Muserlian

(57) ABSTRACT

A guide rail (1) of a linear guide, on which a guide carriage (2) can be mounted longitudinally displaceably, the guide rail (1) having an underside, by means of which it can be arranged on a mounting surface (3), and two opposite longitudinal sides which are provided with running tracks (8), rail parts (10) of the guide rail (1) which are arranged one behind the other being connected to one another by means of connecting elements (13, 21), a tension element (19a) being provided in order to brace the connected rail parts (10) with respect to one another.

9 Claims, 3 Drawing Sheets

FOREIGN PATENT DOCUMENTS

Figure 1:
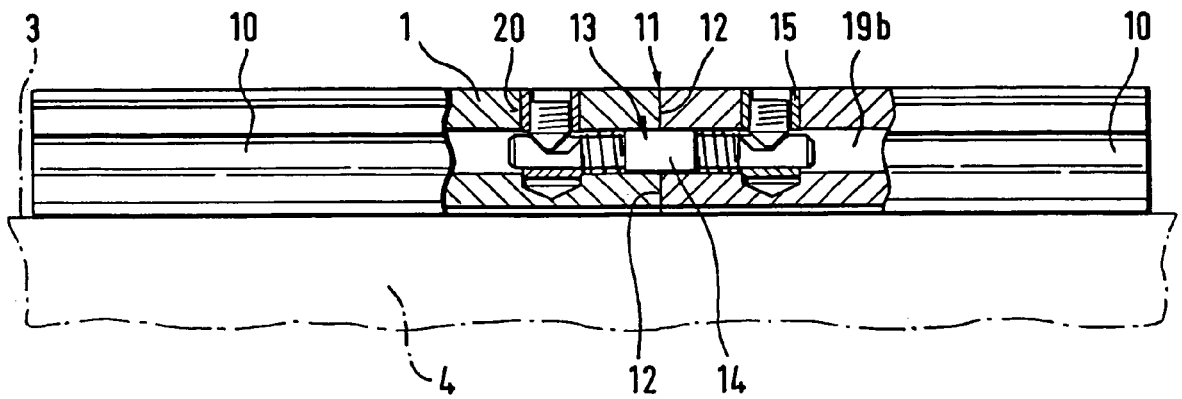

| | | |
|---|---|---|
| DE | 197 50 113 | 5/1998 |
| DE | 197 12 100 | 6/1998 |
| DE | 42 25 914 | 7/1998 |
| DE | 197 58 346 | 7/1998 |
| DE | 297 23 560 | 11/1998 |
| DE | 20020 996 | 4/2001 |
| JP | 07 124831 | 5/1995 |

\* cited by examiner

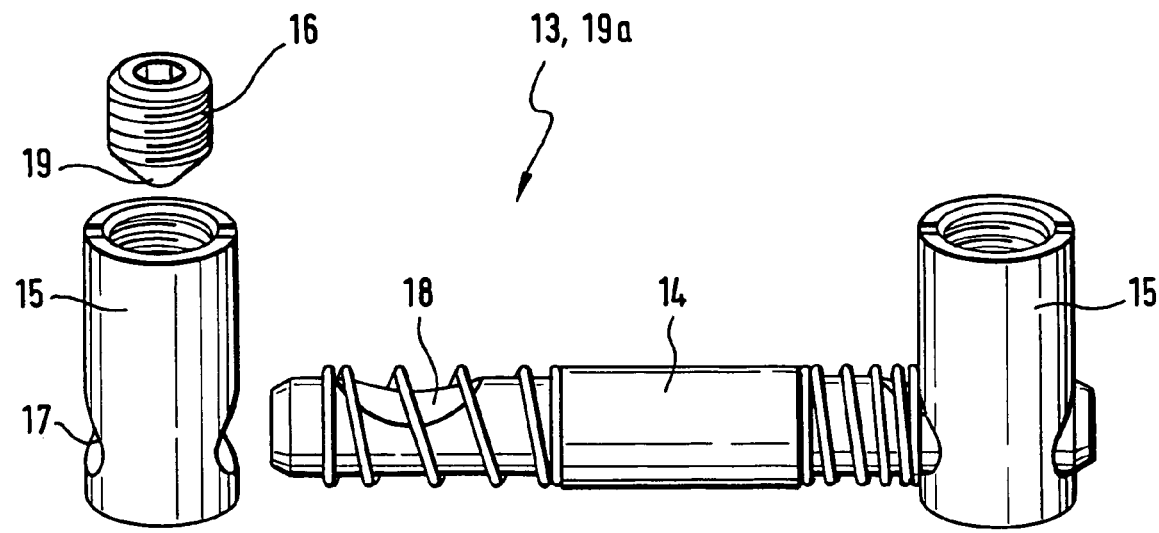
Fig. 4  (State of the art)
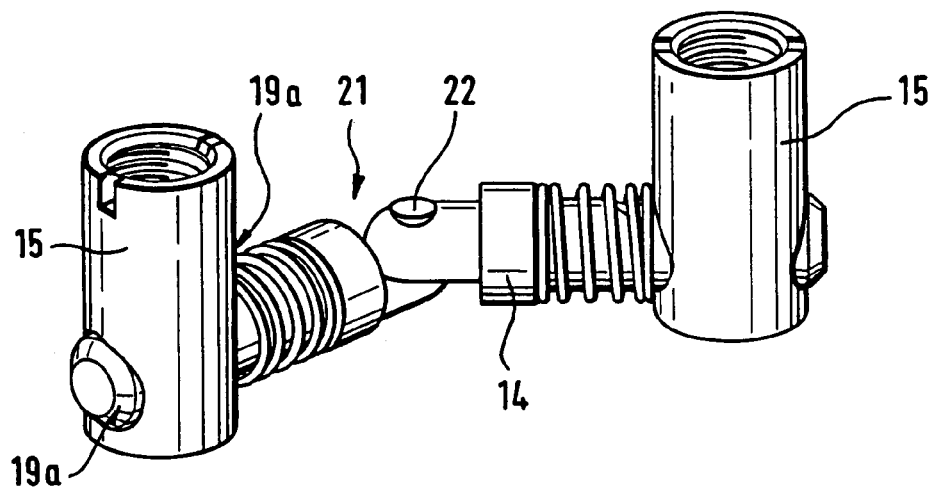
Fig. 5  (State of the art)

GUIDE RAIL FOR GUIDE CARRIAGES OF A LINEAR GUIDEWAY

The present invention relates to a guide rail of a linear guide. Guide rails of this type are used, for example, in machine tool construction in order to guide loads linearly in a satisfactory way.

A guide system became known, for example, from DE 197 58 346 A1, in which the guide rail is placed with its underside onto a mounting surface of a connection part and is fastened by fastening screws, the guide rail having passage bores through which fastening screws for screwing to the connection part can be lead. These fastening screws are actuated, that is to say screwed, from the guide rail top side lying opposite the underside. The guide rail is provided on two opposite longitudinal sides with running tracks for rolling bodies of the guide carriage. The guide rail is composed of a plurality of rail parts arranged one behind the other, rail parts adjacent to one another being connected to one another by means of connecting elements. The rail parts are connected in alignment to one another with the aid of keys or tongues inserted in keyways, the keyways being provided on one of the fastening sides. The rail parts are fastened to a carrying structure by means of bolts. Each rail part is fastened with fastening screws to a carrying structure by means of baseparts. When the key is seated firmly in the keyways, the two rail parts thus connected to one another can no longer be displaced in relation to one another, or only with very great effort, in order to ensure that these two machine parts are satisfactorily aligned with one another. If, for example, the keyways are not formed centrally on the machine parts to a satisfactory extent, then albeit only slight lateral offset may occur between the two rail parts, so that an edge is formed undesirably in the running track region of the transition from one rail part to the other rail part. If the key is arranged with play in the keyways, then, admittedly, the two rail parts can be aligned satisfactorily with one another, for example by hand, so that the formation of an edge in the transition from one rail part, to the other rail part is ruled out. If, however, the rail parts are screwed to the connection part by means of fastening screws, displacements, albeit only slight, of the two rail parts in relation to one another may occur during the screwing operation. When the rail parts are then finally seated firmly, an undesirable offset between the two rail parts may be formed again.

The object of the present invention is to specify a guide rail according to the features of the precharacterizing clause of claim 1, which can be mounted satisfactorily.

This object is achieved, according to the invention, in that a tension element is provided in order to brace the connected rail parts with respect to one another. In the guide rails according to the invention, the rail parts can be aligned with one another satisfactorily. The rail parts thus aligned with one another satisfactorily are then braced with one another by means of the tension element. In this braced arrangement, displacements of the rail parts with respect to one another are ruled out. The rail parts thus braced with one another can then easily be screwed to a connection part in a known way, for example by means of the fastening screws. A height offset occasionally has to be compensated. This may occur when the guide rail lies with its underside on the mounting surface of the connection part, but the mounting surface is not satisfactorily planar. When the rail parts connected to one another are satisfactorily aligned with one another and braced with respect to one another, a compensation element can be inserted between the connection part and the guide rail.

Conventionally, the guide rails of linear guides are screwed to the connection part by means of fastening screws. For this purpose, the guide rails have passage bores which penetrate the top side and the underside of the guide rail. The fastening screws are actuated from the top side of the guide rail. For simple mounting, in a development according to the invention, the tension element can be actuated from the top side of the guide rail. There is no need, in the guide rail according to the invention, for complicated conversions or modifications.

Depending on the application, linear guides are also used in which the guide rail has curved rail parts, that is to say arcuate parts. It may be expedient, here, if the connecting element has a joint, the joint axis of which is arranged transversely to the longitudinal axis of the guide rail. A connecting element of this type can easily be used for different curvatures or transitions from curved rail parts to straight rail parts.

The tension element is preferably such that, by the tension element being actuated, two rail parts arranged adjacently to one another can be pressed with their mutually confronting end faces against one another. When the end faces are in contact with one another over a large area and pressed against one another, there is non positive connection between the two rail parts. The non positive connection is dependent on the pressure force and on a coefficient of friction which can be determined for the given pairing.

Guide rails according to the invention may have, on their longitudinal sides, running wires, the surface area of which forms the running tracks for the rolling bodies, and in this case the rolling bodies may be formed by running rollers which roll with their running grooves on the running wires.

However, advantageously, guide rails according to the invention are suitable likewise for linear guides in which the running tracks are formed by ball grooves which are formed on the guide rail and on which balls rotating endlessly in the guide carriage roll. Instead of the ball grooves, planar running surfaces may also be provided, on which rollers rotating endlessly in the guide carriage roll.

The running tracks may also in a known way be sliding tracks, the guide carriage then likewise being provided with sliding tracks of this type which are slide-mounted on the running tracks or sliding tracks of the guide rail. In this case, the guide carriage is slide-mounted on the guide rail.

The connecting element and the tension element may be individual elements independent of one another. Beneficially, the two elements may be designed as a common element. For example, commercially available connecting elements are known which can at the same time also assume the function of the tension element.

By means of the guide rail according to the invention, a simple and reliable method for aligning and fixing the rail parts of the guide rail which are arranged adjacently to one another can be carried out, specifically according to the following steps:

First, two rail parts arranged adjacently to one another are connected to one another by means of the connecting element and, insofar as this has not yet taken place, are placed with their underside onto the mounting surface. In this situation, the rail parts can easily be aligned by hand. The tension element is then actuated until the end faces of the two rail parts are pressed against one another to an extent such that displacements of the rail parts by the application of an actuating force are still possible in order to align the rail parts with one another. A test gage is then placed onto the guide rail, said test gage bearing preferably with its test surfaces both against the running tracks of one rail part and against the running tracks of the other rail part. With the aid of the test gage, it can be ascertained whether edges are formed in the region of the running tracks at the join of the two rail parts. For example, the test gage used may be the guide carriage itself, the rolling bodies of which have the rolling surfaces which form the test surfaces. When the guide carriage is moved over the join, it can easily be ascertained whether there is still an undesirable edge present at the join in the region of the running tracks. Should this be so, a required alignment of the rail parts by application of the actuating force can take place. Admittedly, in this situation, the rail parts are already pressed with their mutually confronting end faces against one another. In order to ensure that, during the operation of fastening the guide rail to the connection part, undesirable displacements of the machine parts in relation to one another are in all events ruled out, it is advantageous to actuate the tension element repeatedly, in order to increase further the pressure force between the two end faces, with the result that the rail parts adjacent to one another are satisfactorily fixed in their aligned position with respect to one another. The guide rail can be easily be fastened to a connection part by means of fastening elements in a known way, without an undesirable deviation of one of the rail parts occurring.

Figure 2:
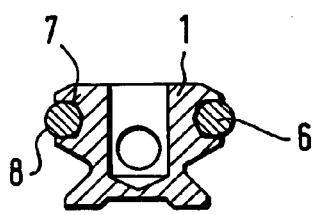
Figure 3:
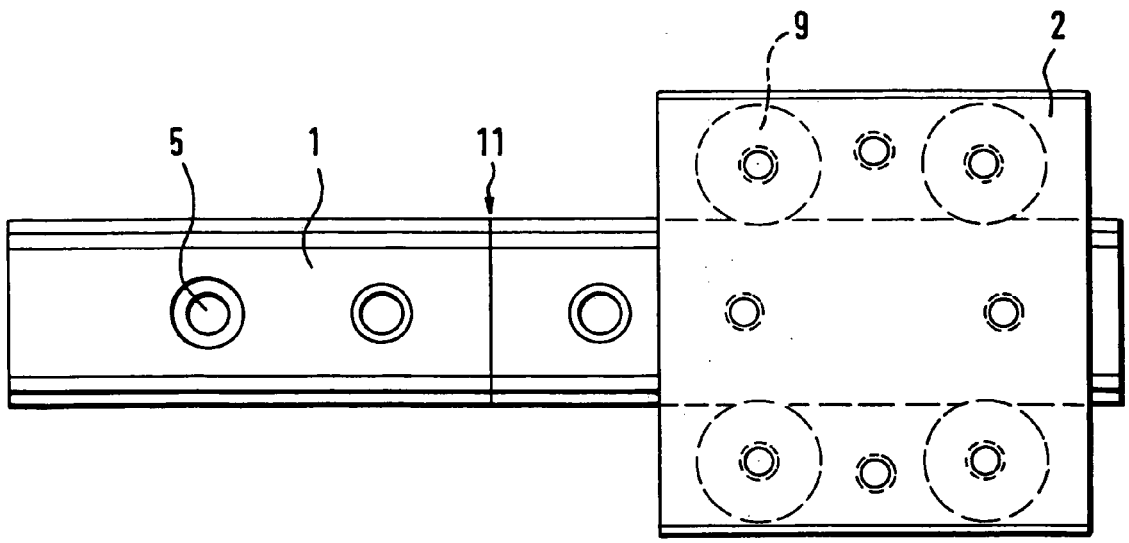
Figure 6:
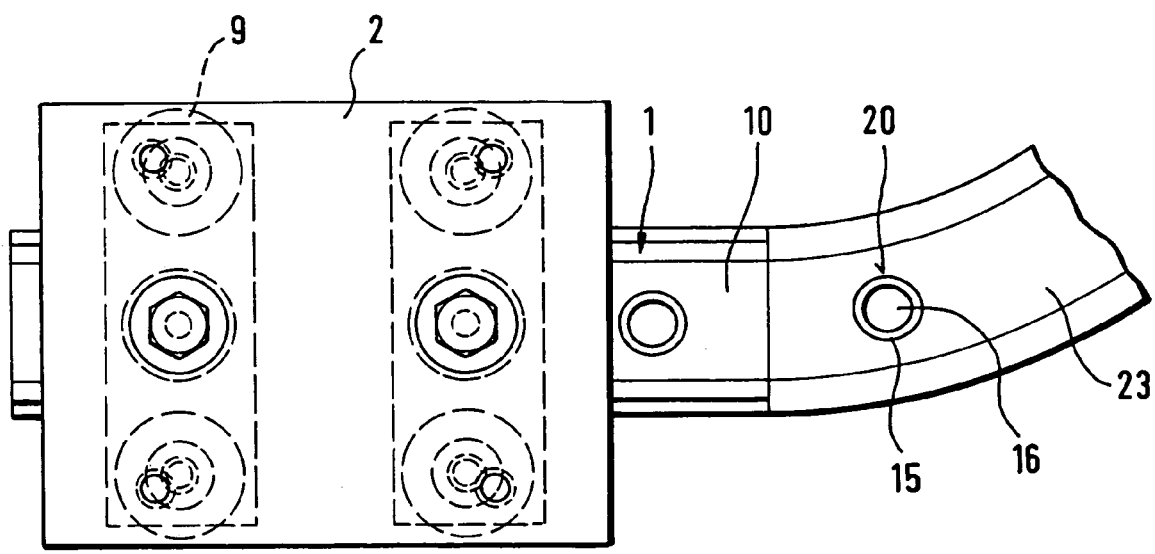

The invention is explained in more detail below by means of two exemplary embodiments depicted in a total of five figures in which:

FIG. 1 shows a guide rail according to the invention in a partially truncated illustration, FIG. 2 shows a cross section through the guide rail from FIG. 1, FIG. 3 shows the guide rail from FIG. 1 with a mounted guide carriage, FIG. 4 shows a connecting element known per se for the connection of two rail parts, FIG. 5 shows a further connecting element known per se for the connection of two rail parts, and FIG. 6 shows a further guide rail according to the invention.

FIGS. 1 to 3 depict a guide rail 1 according to the invention of a linear guide, on which a guide carriage 2 is mounted longitudinally moveably. The guide rail 1 lies with its underside on a mounting surface 3 of a connection part 4 and is screwed to this connection part 4. The connection part 4 is merely indicated here for the sake of simplicity. The guide rail 1 is provided, for the reception of fastening screws, with a plurality of passage bores 5 arranged one behind the other. The passage bores 5 extend from the guide rail top side lying opposite the underside as far as the underside of the guide rail 1.

It may be gathered from FIG. 2 that running wires 6 are inserted in slots 7 on the two opposite longitudinal sides, the convex surface area of the running wire 6 being designed as a running track 8 for rolling bodies of the guide carriage 2. It may be gathered from FIG. 3 that the rolling bodies are formed by running rollers 9 which are received rotatably on the guide carriage 2. The running rollers 9 roll with their circumference on the running tracks 8 of the running wires 6.

It may be gathered from FIGS. 1 and 2 that the guide rail is composed of a plurality of rail parts 10 arranged one behind the other, with the faces 12 of two rail parts 10 adjacent to one another bearing against one another at the join 11 of the latter.

It may be gathered from FIG. 1 that two adjacent rail parts 10 are connected to one another by means of a connecting element 13.

FIG. 4 shows the connecting element 13 which is used in the exemplary embodiment according to FIGS. 1 to 3 and which already belongs to the prior art. It comprises essentially a piston 14 and two sleeves 15 into each of which a tension screw 16 is screwed. The sleeves 15 are each provided with a transverse bore 17 into which the piston 14 engages in each case with one end. The piston 14 is provided at each of its two ends with a wedge-shaped pocket 18. The tension screw 16 is provided at its end facing the wedge-shaped pocket 18 with a conical head 19. When the tension screw 16 is screwed inward into the sleeve 15, the conical head 19 comes into engagement with the wedge-shaped pocket 18. On account of a wedge effect between the conical head 19 and the wedge-shaped wall of the wedge-shaped pocket 18, when the tension screw 16 is rotated further inward, a displacement of the piston 14 with respect to the respective sleeve 15 takes place. In other words: the distance between the two sleeves 15 can be set via the position of the tension screw 16 in a sleeve 15. The sleeve 15, the tension screw 16 and the piston 14 provided with the wedge-shaped pocket 18 form a tension element 19a which is integrated into the connecting element 13.

It may be gathered from FIG. 1 that these sleeves 15 are inserted in bores 20, these bores 20 being designed in the present case as a blind hole. The bores 20 emanate from the top side of the guide rail 1. This ensures that the tension screws 16 are accessible, that is to say can be actuated, from the top side of the guide rail 1. In the same way as the tension screws 16, the fastening screws 5 inserted in the passage bores 5 can also be tightened from the top side of the guide rail.

In the illustration according to FIGS. 1 and 3, the tension screws 16 are tightened to an extent such that the end faces 12 of the two rail parts 10 are pressed against one another; a relative displacement between the two rail parts 10 is ruled out to an extent such that the guide rail 1 can be satisfactorily screwed to the connection part 4 and fastened to the latter by means of the fastening screws, not illustrated. During this fastening operation, a slipping of one of the two rail parts 10 out of place is ruled out.

The connecting element 21, which likewise belongs to the prior art and is depicted in FIG. 5, differs from that from FIG. 4 merely in that the piston 14 is equipped with a joint 22. The tension element 19a is designed in the same way as in the connecting element 13.

This connecting element 21 is used in the guide rail depicted in FIG. 6. It may be gathered from FIG. 6 that an arcuate part 23 adjoins a straight rail part 10 of the guide rail 1. The connecting element 21 having the joint 22 described is suitable for purposes in which an arcuate part 23 adjoins a straight rail part 10. The joint axis is arranged transversely to the longitudinal axis of the guide rail 1 and parallel to the center axis of the arcuate part 23. The joint 22 makes it possible for these connecting elements 21 to be used in any desired combinations of straight or curved rail parts.

It may be gathered from FIG. 1 that the piston 14 penetrates into piston bores 19b which are provided on the rail parts 10, these piston bores 19b being arranged in the longitudinal direction of the rail parts 10.

Instead of the connecting elements known per se, described here, for example, all those connecting elements are suitable for the present invention in which the connected rail parts can be pressed with their mutually confronting end faces against one another in order to make a nonpositive connection. For example, it is conceivable that, instead of the piston, a threaded rod is used, which is provided with two threaded portions, one of which has a lefthand thread and the other of which has a righthand thread. One threaded portion then engages into a threaded bore at one rail part and the other threaded portion engages into a further threaded bore at the other rail part. When the threaded rod is rotated in one direction, the threaded portions are screwed further into the threaded bores, with the result that the two end faces of the rail parts are pressed against one another, in order to make the desired frictional connection.

The invention also embraces guide rails in which the connecting elements and the tension elements are in each case designed as elements separate from one another.

REFERENCE SYMBOLS 1 guide rail
2 guide carriage
3 mounting surface
4 connection part
5 passage bore
6 running wire
7 slot
8 running track
9 running roller
10 rail part
11 join
12 end face
13 connecting element
14 piston
15 sleeve
16 tension screw
17 transverse bore
18 wedge-shaped pocket
19 conical head
19a tension element
19b piston bore
20 bore
21 connecting element
22 joint
23 arcuate part

The invention claimed is:

1. A guide rail of a linear guide, on which a guide carriage can be mounted longitudinally displaceably, the guide rail having an underside, by means of which it can be arranged on a mounting surface, and two opposite longitudinal sides which are provided with running tracks, rail parts of the guide rail which are arranged one behind the other being connected to one another by means of connecting elements, wherein a tension element is provided to brace the connected rail parts with respect to one another, the guide rail is provided with bores emanating from the top side of the guide rail and that the tension element has a tensioning screw inserted in the bore to be actuated from the top side of the guide rail.

2. The guide rail as claimed in claim 1, in which two rail parts arranged adjacent to one another can be pressed with their mutually confronting end faces against one another by means of the tension element.

3. The guide rail as claimed in claim 1, in which the running tracks are formed on running wires, the rolling bodies being formed by running rollers (9) which roll on the running wires.

4. The guide rail as claimed in claim 1, in which the running tracks are formed by ball grooves which are formed on the guide rail and on which balls rotating endlessly in the guide carriage roll.

5. The guide rail as claimed in claim 1, in which the running tracks are formed by planar running surfaces which are formed on the guide rail and on which rollers rotating endlessly in the guide carriage roll.

6. A method for aligning and fixing rail parts, arranged adjacently to one another, of the guide rail as claimed in claim 1 according to the following steps:
   connection of two rail parts arranged adjacently to one another by means of the connecting element,
   arrangement of the rail parts with their underside on the mounting surface,
   insofar as this has not already taken place before the above-mentioned step,
   actuation of the tension element until the end faces of the two ends of the rail parts are pressed against one another to an extent such that displacements of the rail parts by the application of an actuating force are still possible to align the rail parts with one another,
   placing of a test gauge onto the guide rail, said test gauge bearing with test surfaces both against the running tracks of one rail part and against the running tracks of the other rail part,
   optionally, renewed actuation of the tension element, with the result that the rail parts adjacent to one another are satisfactorily fixed in their aligned position with respect to one another,
   fastening of the guide rail to a connection part by means of fastening elements in which the test gauge is formed by the guide carriage the rolling bodies of which are provided with rolling surfaces which form the test surfaces.

7. A guide rail of a linear guide, on which a guide carriage can be mounted longitudinally displaceably, the guide rail having an underside, by means of which it can be arranged on a mounting surface and two opposite longitudinal sides which are provided with running tracks, rail parts of the guide rail which are arranged one behind the other being connected to one another by means of connecting elements, wherein a tension element is provided to brace the connected rail parts with respect to one another, wherein the tensioning element is formed by a piston and two sleeves, into each of which a tension screw is screwed and wherein the sleeves are inserted into bores of the rail parts and wherein the piston penetrates into piston bores of the rail parts.

8. A guide rail as claimed in claim 7, in which the piston is provided at each of its two ends with a wedge-shaped pocket and in which the tension screw is provided at its end facing the wedge-shaped pocket with a conical head.

9. A guide rail of a linear guide, on which a guide carriage can be mounted longitudinally displaceably, the guide rail having an underside, by means of which it can be arranged on a mounting surface and two opposite longitudinal sides which are provided with running tracks, rail parts of the guide rail which are arranged one behind the other being connected to one another by means of connecting elements, wherein a tension element is provided to brace the connected rail parts with respect to one another, wherein the connecting element additionally has a joint, the joint axis of which is arranged transversely to the longitudinal axis of the guide rail.

* * * * *